| (12) | United States Patent | (10) Patent No.: | US 11,041,224 B2 |
|---|---|---|---|
| | Gao et al. | (45) Date of Patent: | Jun. 22, 2021 |

(54) PORTABLE MULTI-AZIMUTH ULTRASONIC-ASSISTED VIBRATION ROLLING DEVICE AND APPLICATION METHOD THEREOF

(71) Applicant: HENAN POLYTECHNIC UNIVERSITY, Jiaozuo (CN)

(72) Inventors: Guofu Gao, Jiaozuo (CN); Zhaojie Yuan, Jiaozuo (CN); Yi Wang, Jiaozuo (CN); Bo Zhao, Jiaozuo (CN); Daohui Xiang, Jiaozuo (CN); Yongqin Wang, Jiaozuo (CN)

(*) Notice: Subject to any disclaimer, the term of this patent is extended or adjusted under 35 U.S.C. 154(b) by 0 days.

(21) Appl. No.: 17/130,956

(22) Filed: Dec. 22, 2020

(65) Prior Publication Data

US 2021/0108281 A1     Apr. 15, 2021

Related U.S. Application Data

(63) Continuation of application No. PCT/CN2020/096218, filed on Jun. 15, 2020.

(30) Foreign Application Priority Data

Jul. 30, 2019   (CN) .......................... 201910693285.4

(51) Int. Cl.
   *C21D 9/32*  (2006.01)
   *C22F 1/18*  (2006.01)
   *C21D 7/04*  (2006.01)

(52) U.S. Cl.
   CPC .................. *C21D 9/32* (2013.01); *C21D 7/04* (2013.01); *C22F 1/183* (2013.01)

(58) Field of Classification Search
   CPC .............. C21D 9/32; C21D 7/04; C22F 1/183
   See application file for complete search history.

(56) References Cited

U.S. PATENT DOCUMENTS

2020/0216924 A1* 7/2020 Reeb ........................ C21D 7/02

FOREIGN PATENT DOCUMENTS

| CN | 104630430 A | 5/2015 |
|---|---|---|
| CN | 105127668 A | 12/2015 |

(Continued)

OTHER PUBLICATIONS

Machine Translation of CN-106363344-A (Year: 2017).*

(Continued)

*Primary Examiner* — Paul A Wartalowicz
*Assistant Examiner* — Ryan L Heckman
(74) *Attorney, Agent, or Firm* — W&K IP

(57) ABSTRACT

The present invention discloses a portable multi-azimuth ultrasonic-assisted vibration rolling device and an application method thereof. The vibration rolling device includes an ultrasonic rolling unit, a hydraulic power unit, a pneumatic cooling unit, a main body frame and an indexing device; an amplitude transformer assembly at the ultrasonic rolling unit comes into rolling contact with the surface of a tooth space of a gear workpiece, the hydraulic power unit is articulated with the main body frame, and the hydraulic power unit is articulated with the horn assembly, the indexing device is provided at the main body frame, and the gear workpiece is mounted at the indexing device. The present invention has the advantages that the device is flexible and portable, enables a transducer to be cooled continuously, and facilitates fixation of a rolling steel ball and adjustment of a station of the gear workpiece.

7 Claims, 16 Drawing Sheets

(56) References Cited

FOREIGN PATENT DOCUMENTS

| | | | |
|---|---|---|---|
| CN | 105127668 B | * | 12/2015 |
| CN | 106363344 A | * | 2/2017 |
| CN | 106363344 A | | 2/2017 |
| CN | 106885744 A | | 6/2017 |
| CN | 109182698 A | * | 1/2019 |
| CN | 109182698 A | | 1/2019 |
| CN | 110358901 A | | 10/2019 |

OTHER PUBLICATIONS

Machine Translation of CN-109182698-A (Year: 2019).*
Machine Translation of CN-105127668-B (Year: 2015).*
International Search Report and Writen Opinion of PCT/CN2020/096218 dated Sep. 9, 2020.

* cited by examiner

A-A

PORTABLE MULTI-AZIMUTH ULTRASONIC-ASSISTED VIBRATION ROLLING DEVICE AND APPLICATION METHOD THEREOF

CROSS-REFERENCE TO RELATED APPLICATIONS

This application is a continuation of International Application No. PCT/CN2020/096218 with a filling date of Jun. 15, 2020, designating the United states, and further claims to the benefit of priority from Chinese Application No. 201910693285.4 with a filing date of Jul. 30, 2019. The content of the aforementioned applications, including any intervening amendments thereto, are incorporated herein by reference.

TECHNICAL FIELD

The present invention relates to the field of mechanical metal-surface strengthening technologies, and particularly to a portable multi-azimuth ultrasonic-assisted vibration rolling device and an application method thereof.

BACKGROUND

Failure modes of mechanical parts mainly include residual deformation, fatigue, corrosion, abrasion, or the like, and failure of metal parts begins from the surfaces of the parts which move relatively. Improvement in the surface performance of the parts is one of effective ways to reduce the failure of the parts and prolong the service life of the parts. Therefore, the mechanical surface strengthening technology is widely applied to the manufacturing process of the mechanical parts.

An ultrasonic rolling machining method belongs to an ultrasonic-assisted machining technology, and compared with a traditional rolling process, has the main advantages that elastic pressure and friction force are smaller, higher surface smoothness may be obtained, surface hardness and surface wear resistance are improved significantly, and corrosion resistance and fatigue resistance are increased.

However, the common ultrasonic rolling machining method has defects that an ultrasonic vibration device is usually mounted at a spindle of a machine tool, the surface of the part is processed by the primary motion of the spindle with the assistance of ultrasonic vibration, and the method has strong dependence on the machine tool, wastes time and labor every time a tool is set, has an efficiency which is extremely low, and is difficult to guarantee the surface size precision required by the part; meanwhile, due to the high frequency (usually 30 KHz-35 KHz) of a transducer selected for the ultrasonic rolling process, the transducer generates a lot of heat during operation, which causes a sudden rise of the temperature of components and parts in an ultrasonic rolling machining device, tending to damage the components and parts. Due to the poor heat dissipation effect, after a period of time of the machining process, the piezoelectric ceramic transducer has to be cooled for continuous operation, and thus, the sustainable machining time is quite short, thereby greatly shortening the effective working time of the ultrasonic rolling machining process; usually, a steel ball in a ball socket of a tool head is fastened by means of extrusion or a pressing-cap fit, the extrusion may damage the surface of the steel ball to affect the surface processing precision of the part in the rolling process, and the steel ball is difficult to remove when damaged; the pressing-cap fit makes the mounting process of the steel ball relatively complicated.

SUMMARY OF THE INVENTION

An objective of the present invention is to provide a portable multi-azimuth ultrasonic-assisted vibration rolling device and an application method thereof, and the vibration rolling device according to the present invention is flexible and portable, enables a transducer to be cooled continuously, and facilitates fixation of a rolling steel ball and adjustment of a station of a gear workpiece.

In order to achieve the above-mentioned objective, the following technical solution is adopted in the present invention.

A portable multi-azimuth ultrasonic-assisted vibration rolling device includes an ultrasonic rolling unit, a hydraulic power unit, a pneumatic cooling unit, a main body frame and an indexing device; the ultrasonic rolling unit includes an ultrasonic generator and an amplitude transformer assembly, and the ultrasonic generator is connected with the amplitude transformer assembly which is provided in the main body frame; the hydraulic power unit includes a hydraulic station, a flow divider valve, a force-application hydraulic cylinder and an angle-adjusting hydraulic cylinder; the flow divider valve is mounted at the hydraulic station and connected with the force-application hydraulic cylinder and the angle-adjusting hydraulic cylinder through an oil passage respectively, the bottoms of cylinder bodies of the force-application hydraulic cylinder and the angle-adjusting hydraulic cylinder are articulated with the main body frame, and outer ends of piston rods of the force-application hydraulic cylinder and the angle-adjusting hydraulic cylinder are articulated with the amplitude transformer assembly respectively; the indexing device is provided at the main body frame below the amplitude transformer assembly, a gear workpiece is mounted at the indexing device, and the amplitude transformer assembly comes into rolling contact with the surface of a tooth space of the gear workpiece.

The amplitude transformer assembly includes an amplitude transformer, a transducer, an amplitude-transformer protective box, a force-application lifting lug, a gas inlet connector, a gas return connector, a transposition lifting lug, a rolling steel ball, a negative-pressure gas extraction connector and a negative pressure fan; the amplitude transformer is vertically and fixedly mounted at the bottom of the amplitude-transformer protective box by a flange, and has an upper end in the amplitude-transformer protective box and a lower end below the bottom of the amplitude-transformer protective box; the transducer is fixedly mounted at the upper end of the amplitude transformer through a connecting bolt, a rolling tool head is fixedly connected to the lower end of the amplitude transformer, and a ball socket is provided at the lower end of the rolling tool head the amplitude transformer, the transducer and the rolling tool head have coinciding center lines, the connecting bolt, the transducer, the amplitude transformer and the rolling tool head are all provided with through vent holes along the center lines thereof, and the ball socket is communicated with the vent holes; the rolling steel ball is provided in the ball socket at the lower end of the rolling tool head, and has a surface coming into rolling contact with the surface of the tooth space of the gear workpiece, and the negative-pressure gas extraction connector is fixedly mounted at the top of the connecting bolt and communicated with the vent holes; the negative pressure fan is connected with a suction pipe, the suction pipe penetrates through the amplitude-transformer protective box to be connected with the negative-pressure gas extraction connector, the contact part of the suction pipe and the amplitude-transformer protective box is sealed, and the ultrasonic generator is connected with the transducer through a cable; the force-application listing lug is fixedly connected to the top of the amplitude-transformer protective box, the gas return connector is fixedly mounted at the left side of the amplitude-transformer protective box, the gas inlet connector is fixedly mounted on the front side of the amplitude-transformer protective box, and the transposition lifting lug is fixedly connected to the right side of the amplitude-transformer protective box.

The pneumatic cooling unit includes a cooling-gas circulating device and a gas distributing valve, the gas distributing valve is mounted at the cooling-gas circulating device, a gas inlet pipe is connected between a gas outlet of the gas distributing valve and the gas inlet connector, and a gas outlet pipe is connected between a gas inlet of the gas distributing valve and the gas return connector.

The main body frame is configured as a quadrangular frame and enclosed by four vertical square tubes and eight horizontal square tubes, and a supporting square tube is fixedly connected between the two vertical square tubes on the right side; the amplitude-transformer protective box is located in the main body frame, the bottom of the cylinder body of the force-application hydraulic cylinder is articulated with the upper-right horizontal square tube, and an outer end of the piston rod of the force-application hydraulic cylinder is articulated with the force-application lifting lug; the bottom of the cylinder body of the angle-adjusting hydraulic cylinder is articulated with the supporting square tube, and an outer end of the piston rod of the angle-adjusting hydraulic cylinder is articulated with the transposition lifting lug; a platform support is fixedly connected between the two horizontal square tubes at the lower left and the lower right of the main body frame, and the indexing device is mounted at the platform support.

The platform support includes two vertical support plates which are horizontally arranged in a left-right direction in parallel, two ends of each vertical support plate are fixedly connected to the lower-left and lower-right horizontal square tubes, two bolt holes and a vertical long hole are formed at symmetrical positions in a front-rear direction of each vertical support plate, an upper side of the vertical long hole is open, at least one bolt hole is formed in each of the two sides of the vertical long hole of each vertical support plate, and at least one inserting hole is formed in each of the two sides of the vertical long hole of the front vertical support plate.

The indexing device includes an indexing disc, a lead screw, a transmission sleeve, a circumferential workpiece positioning sleeve, two guide slide bars and two copper bushes; the lead screw and the guide slide bars are all horizontally arranged in the front-rear direction; the transmission sleeve and the circumferential workpiece positioning sleeve are mounted at the lead screw, the transmission sleeve is located in front of the circumferential workpiece positioning sleeve, and connected with the lead screw in a threaded transmission manner, the circumferential workpiece positioning sleeve is slidably connected with the lead screw, and the total length of the transmission sleeve plus the circumferential workpiece positioning sleeve is less than a distance between the two vertical support plates; the two copper bushes have coinciding axes, and are fixedly connected to the vertical support plates by inserting bolts into the bolt holes on the two sides of the vertical long holes; two ends of the lead screw are mounted at the copper bushes, the lead screw penetrates through the vertical long holes in the vertical support plates, and the front end surfaces of the lead screw are located in front of the vertical support plates; a guide plate is provided at the front end of the transmission sleeve, two bolt holes are formed in the guide plate, the two guide slide bars penetrate through the two bolt holes respectively, a main positioning disc is provided at the rear end of the transmission sleeve, at least one threaded through hole is formed in the main positioning disc, and the guide plate, the transmission sleeve and the main positioning disc are integrated; the two guide slide bars are symmetrically arranged with the lead screw as the center line, inserted through the vertical support plates and the guide plate and fastened to the vertical support plates by nuts; an auxiliary positioning disc is provided at the front end of the circumferential workpiece positioning sleeve and integrated with the circumferential workpiece positioning sleeve, and at least one half-track-shaped long hole is formed in the auxiliary positioning disc; the auxiliary positioning disc is in pressing contact with the main positioning disc, and a positioning bolt penetrates through the threaded through hole in the main positioning disc and the half-track-shaped long hole in the auxiliary positioning disc, such that the main positioning disc is fixedly connected with the auxiliary positioning disc; a shaft shoulder is provided between the circumferential workpiece positioning sleeve and the auxiliary positioning disc for connection, the circumferential workpiece positioning sleeve is sleeved with the gear workpiece which is fixed by a key, a locking nut is mounted at a rear thread of the circumferential workpiece positioning sleeve, and is in pressing contact with the rear side surface of the gear workpiece, and the front side surface of the gear workpiece is in pressing contact with the shaft shoulder; the indexing disc is fixedly mounted at the front end of the lead screw by welding, the indexing disc, the lead screw, the transmission sleeve and the circumferential workpiece positioning sleeve have coinciding center lines, the front side surface of the indexing disc is fixedly connected with at least one rocking handle, at least one positioning through hole is uniformly formed in the indexing disc along the circumference thereof and may correspond to the inserting hole in the front vertical support plate, and a positioning pin is inserted through the inserting hole in the vertical support plate and the positioning through hole in the indexing disc, so as to fix the indexing disc.

The method of using the portable multi-azimuth ultrasonic-assisted vibration rolling device of the present invention includes the following steps:

(1) mounting the gear workpiece;

(2) starting the negative pressure fan, the negative pressure fan vacuumizing the vent holes of the amplitude transformer, the transducer and the rolling tool head through the suction pipe, such that the rolling steel ball is sucked in the ball socket, and at this point, the surface of the rolling steel ball is in rolling contact with the surface of one tooth space of the gear workpiece;

(3) starting the ultrasonic generator, the cooling-gas circulating device and the gas distributing valve, wherein the ultrasonic generator provides a high-frequency pulse signal for the transducer through the cable, transducer converts the high-frequency pulse signal into mechanical vibration, such that the amplitude transformer generates high-frequency vibration and drives the rolling tool head to vibrate at a high frequency, and as such, the rolling steel ball vibrates at a high frequency with the rolling tool head to impact the surface of the gear workpiece at a high frequency; the cooling-gas circulating device outputs cooling gas through the gas outlet of the gas distributing valve, the cooling gas enters the amplitude-transformer protective box through the gas inlet pipe and the gas inlet connector to cool the transducer, and the cooling gas after heat exchange is discharged out of the amplitude-transformer protective box through the gas return connector and the gas outlet pipe, and then enters the cooling-gas circulating device through the gas inlet of the gas distributing valve to be compressed and cooled;

(4) starting the hydraulic station, the hydraulic station controlling the force-application hydraulic cylinder and the angle-adjusting hydraulic cylinder with the flow divider valve respectively, and the piston rods of the force-application hydraulic cylinder and the angle-adjusting hydraulic cylinder being stretched and retracted to adjust the angle and the position of the amplitude-transformer protective box, so as to control the pressure applied to the surface of the gear workpiece by the rolling steel ball and the force application angle; after the surface of the gear workpiece coming into rolling contact with the rolling steel ball is impacted to be strengthened by the rolling steel ball, the positioning pin is drawn out, the indexing disc is rotated by 20 degrees with the rocking handle, the lead screw rotates and drives the transmission sleeve to move by a certain feeding amount along the two guide slide bars, and then, the positioning pin is inserted to fix the indexing disc, such that the gear workpiece moves by a certain amount along the axial direction of the lead screw; as such, the surface of the tooth space of the gear workpiece coming into contact with the rolling steel ball is impacted to be strengthened by the rolling steel ball, and the above operations are repeated until all the surfaces of the tooth space of the gear workpiece at this position are impacted to be strengthened by the rolling steel ball;

(5) rotating the gear workpiece to enable the rolling steel ball to come into rolling contact with the surfaces of the next tooth space of the gear workpiece, and repeating the steps (3) and (4) to enable the surfaces of the next tooth space of the gear workpiece to be impacted to be strengthened by the rolling steel ball; and (6) taking out the gear workpiece after the surfaces of all the tooth spaces of the gear workpiece are rolled.

The step (1) specifically includes: firstly, mounting the transmission sleeve and the circumferential workpiece positioning sleeve at the lead screw, wherein the transmission sleeve is located in front of the circumferential workpiece positioning sleeve; inserting the positioning bolt through the threaded through hole in the main positioning disc and the half-track-shaped long hole in the auxiliary positioning disc, so as to fixedly connect the main positioning disc with the auxiliary positioning disc, thereby fixedly connecting the circumferential workpiece positioning sleeve with the transmission sleeve; then, sleeving the circumferential workpiece positioning sleeve with the gear workpiece, mounting the two ends of the lead screw at the copper bushes, inserting the lead screw through the vertical long holes in the vertical support plates, fixedly mounting the copper bushes at the vertical support plates through the bolts, inserting the two guide slide bars through the vertical support plates and the guide plate, and fixing the two ends of the guide slide bars with the fastening nuts; finally, inserting the positioning pin through the inserting holes in the vertical support plates and the positioning through hole in the indexing disc, so as to fix the indexing disc, thereby guaranteeing fixation of the gear workpiece.

The step (5) specifically includes: removing the positioning bolt, rotating the circumferential workpiece positioning sleeve, rotating and displacing the tooth space of the gear workpiece which is impacted to be strengthened, and meanwhile enabling the surfaces of the next tooth space of the gear workpiece which is not impacted to be strengthened to come into rolling contact with the rolling steel ball; then, inserting the positioning bolt through the threaded through hole in the main positioning disc and the half-track-shaped long hole in the auxiliary positioning disc, so as to fixedly connect the main positioning disc with the auxiliary positioning disc, thereby fixedly connecting the circumferential workpiece positioning sleeve with the transmission sleeve; repeating the steps (3) and (4) to enable the surfaces of the next tooth space of the gear workpiece to be impacted to be strengthened by the rolling steel ball.

The step (6) specifically includes: firstly, removing the fastening nuts, drawing out all the guide slide bars, removing the bolts for fixing the copper bushes, taking the lead screw out of the vertical long holes in the vertical support plates, pulling away the copper bush on the side of the circumferential workpiece positioning sleeve from the lead screw, removing the locking nut from the circumferential workpiece positioning sleeve, and taking away the gear workpiece from the circumferential workpiece positioning sleeve.

The present invention has the following beneficial effects.

1. In the present invention, the hydraulic power unit is provided to control the pressure applied to the surface of the gear workpiece by the rolling steel ball and the force application angle by means of the cooperation of the hydraulic station, the force-application hydraulic cylinder and the angle-adjusting hydraulic cylinder, such that the traditional machining process is not limited by a machine tool, and the integral rolling device is more flexible and portable in use.

2. In the present invention, the pneumatic cooling unit is provided to convey the cooling gas into the amplitude-transformer protective box by the cooling-gas circulating device, the cooling gas cooling the transducer in the amplitude-transformer protective box, and then being discharged from the amplitude-transformer protective box into the cooling-gas circulating device, and as such, the cooling gas is continuously conveyed to cool the transducer continuously when the ultrasonic rolling device is working, and the transducer is guaranteed to work continuously and efficiently.

3. The amplitude transformer, the transducer and the rolling tool head according to the present invention are all provided with the vent holes which are vertically through along the center lines thereof, the ball socket is communicated with the vent holes, the rolling steel ball is provided in the ball socket at the lower end of the rolling tool head, the negative-pressure gas extraction connector is fixedly mounted at the top of the transducer through the connecting bolt and communicated with the vent holes, the negative pressure fan is connected with the suction pipe, the suction pipe penetrates through the amplitude-transformer protective box and is connected with the negative-pressure gas extraction connector, and the negative pressure fan vacuumizes the vent holes of the amplitude transformer, the transducer and the rolling tool head through the suction pipe, such that the rolling steel ball is sucked in the ball socket; with this technical solution, the rolling steel ball is fixed more conveniently, which not only avoids the abrasion of the surface of the steel ball caused when the steel ball is fastened by extrusion, but also saves the complicated operation procedure when the steel ball is fastened by a pressing cap.

4. In the present invention, transmission of the lead screw is combined with the indexing disc to conveniently control the distance of each axial feeding action of the gear workpiece along the lead screw, and to ensure that all the surfaces of each tooth space of the gear workpiece are rolled and impacted to be strengthened by the rolling steel ball; the circumferential workpiece positioning sleeve is provided, such that the gear workpiece may be rotated conveniently to rotate and the tooth space of the gear workpiece which is impacted to be strengthened is displaced, and meanwhile, the surface of the next tooth space of the gear workpiece which is not impacted to be strengthened comes into rolling contact with the rolling steel ball, such that the surface of the next tooth space of the gear workpiece is impacted to be strengthened by the rolling steel ball.

The present invention may be used for machining materials difficult to machine, such as hard alloy, titanium alloy, high-strength steel, or the like, expands the application range of the ultrasonic rolling process, is easy to popularize and implement and has good economic benefits.

DETAILED DESCRIPTION OF PREFERRED EMBODIMENTS

Figure 1:
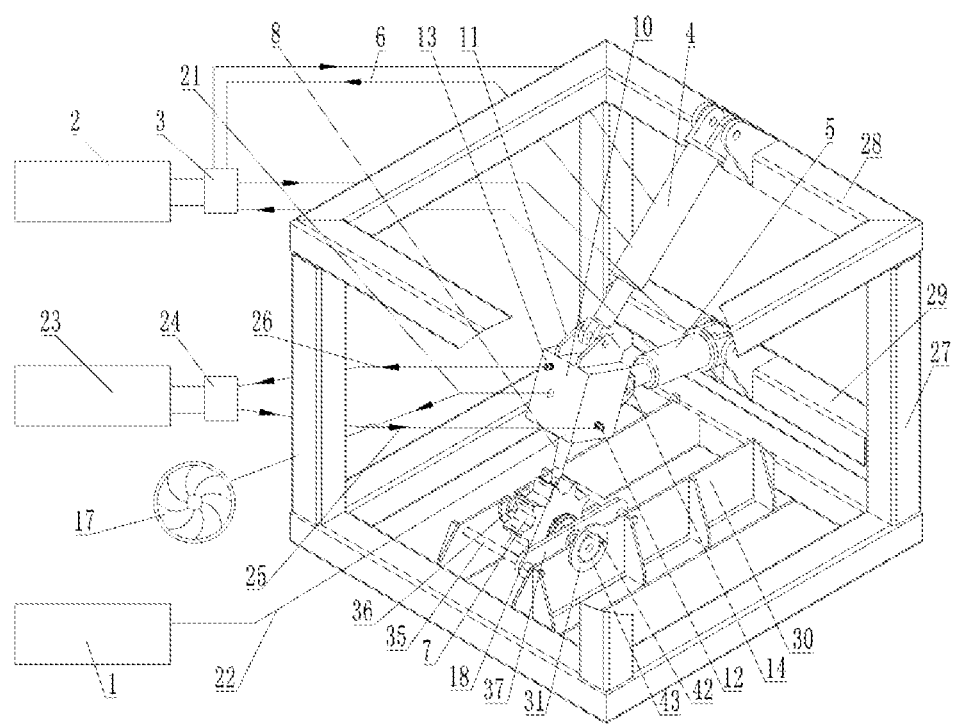
FIG. 1 is a schematic structural diagram of the present invention.

In order to make the technical problems, technical solutions and beneficial effects of the present invention clearer, the present invention will be further described in detail below with reference to the accompanying drawings and embodiments. It should be understood that, the embodiments described herein are only intended to illustrate but not to limit the present invention.

It should be noted that when an element is referred to as being "fixedly mounted" or "fixedly connected" to another element, it may be direct contact or indirect contact.

It is to be understood that terms such as "length", "width", "upper", "lower", "front", "rear", "left", "right", "vertical", "horizontal", "top", "bottom", "inner" and "outer" should be construed to refer to the orientation as then described or as shown in the drawings. These relative terms are for convenience of description and do not indicate or imply that the device or element referred to must have a particular orientation, or be constructed or operated in a particular orientation, and thus cannot be construed to limit the present application.

Figure 2:
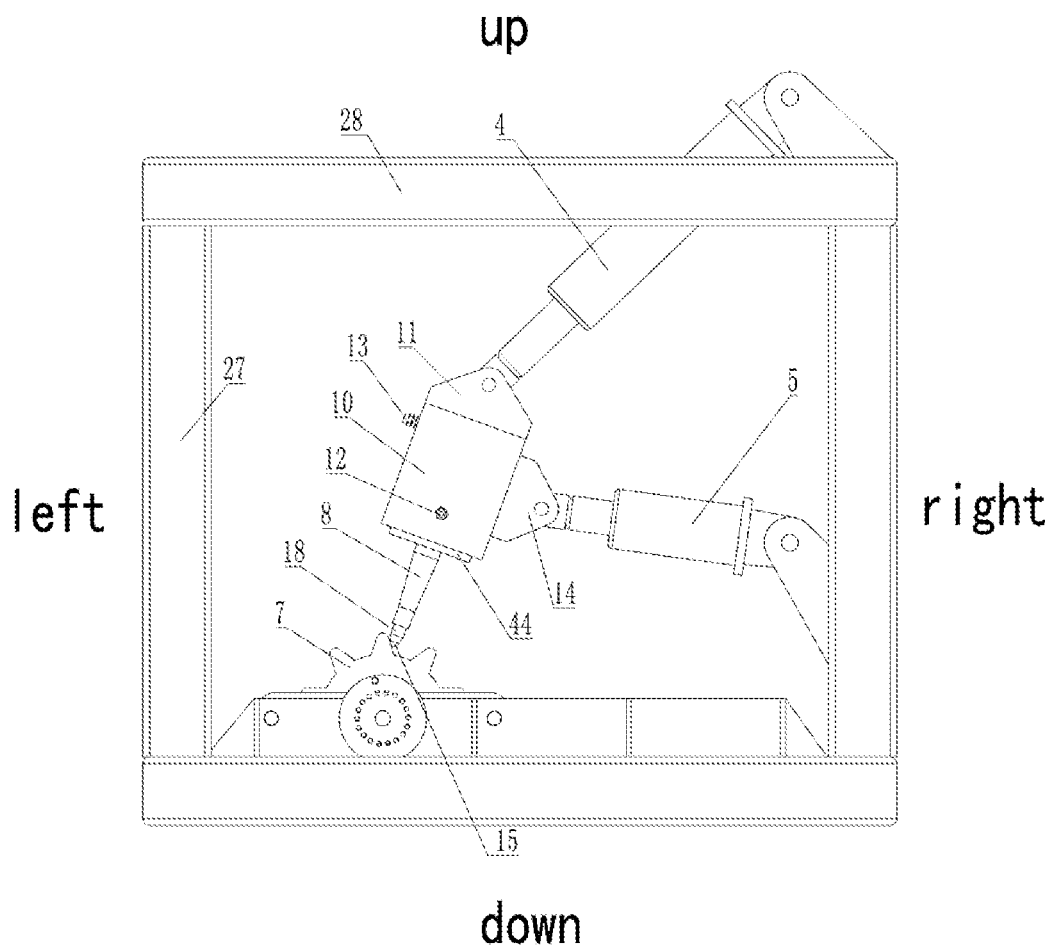
FIG. 2 is a front view of the present invention.
Figure 3:
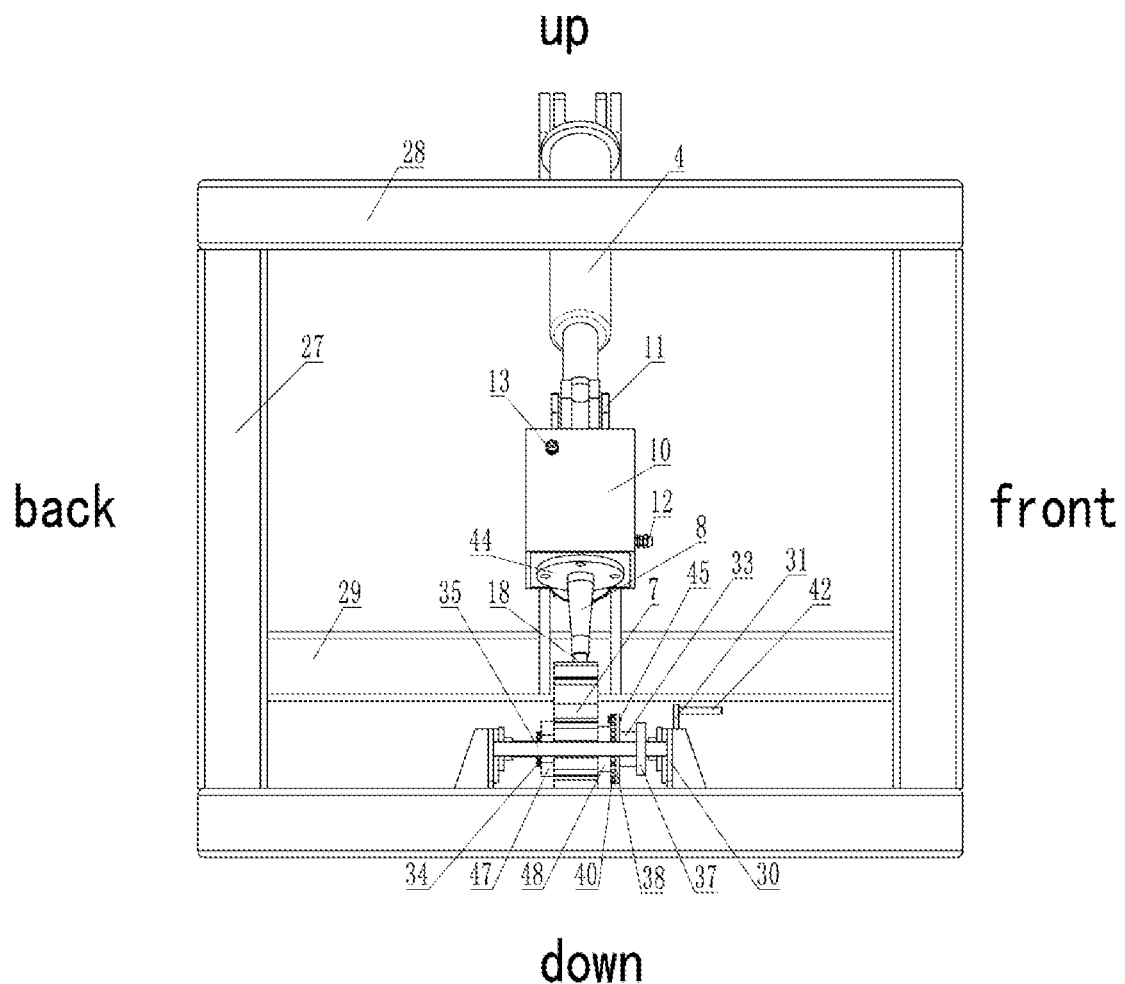
FIG. 3 is a left view of the present invention.
Figure 4:
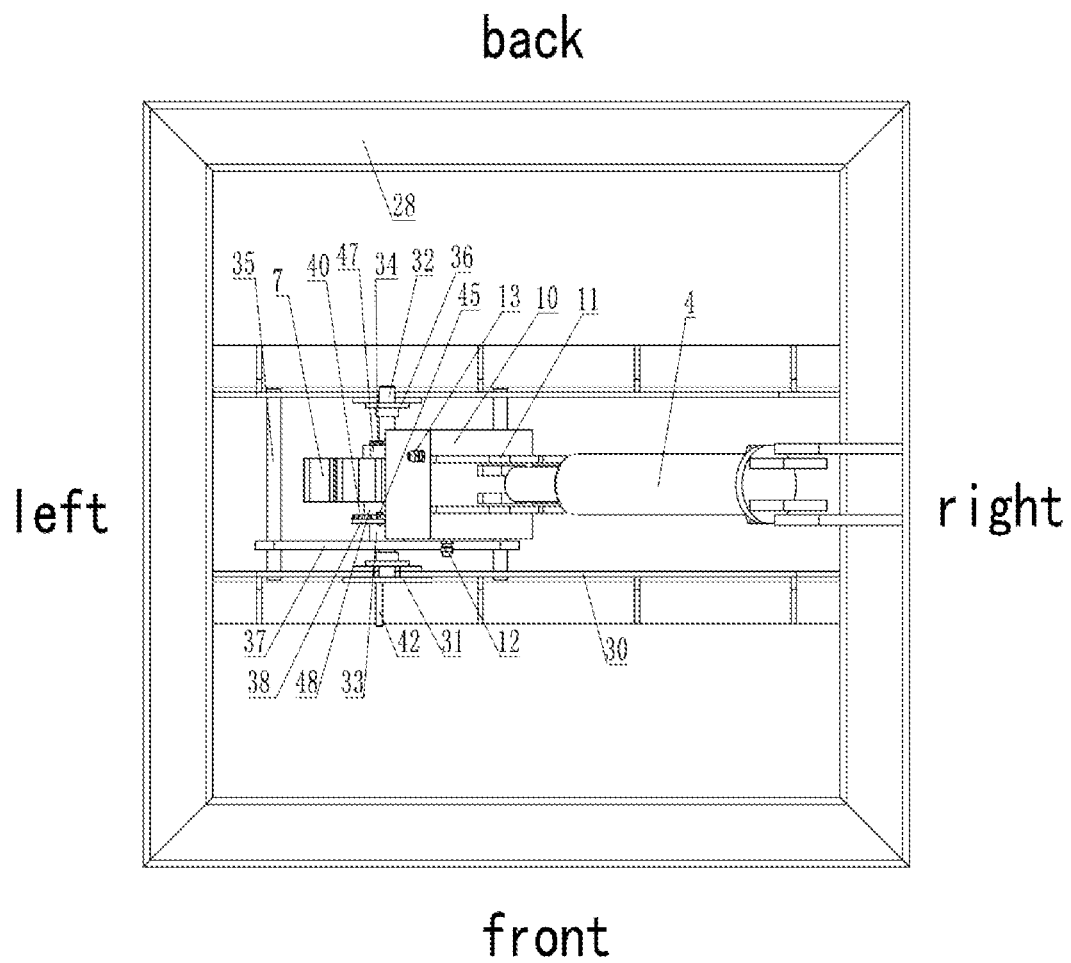
FIG. 4 is a top view of the present invention.
Figure 5:
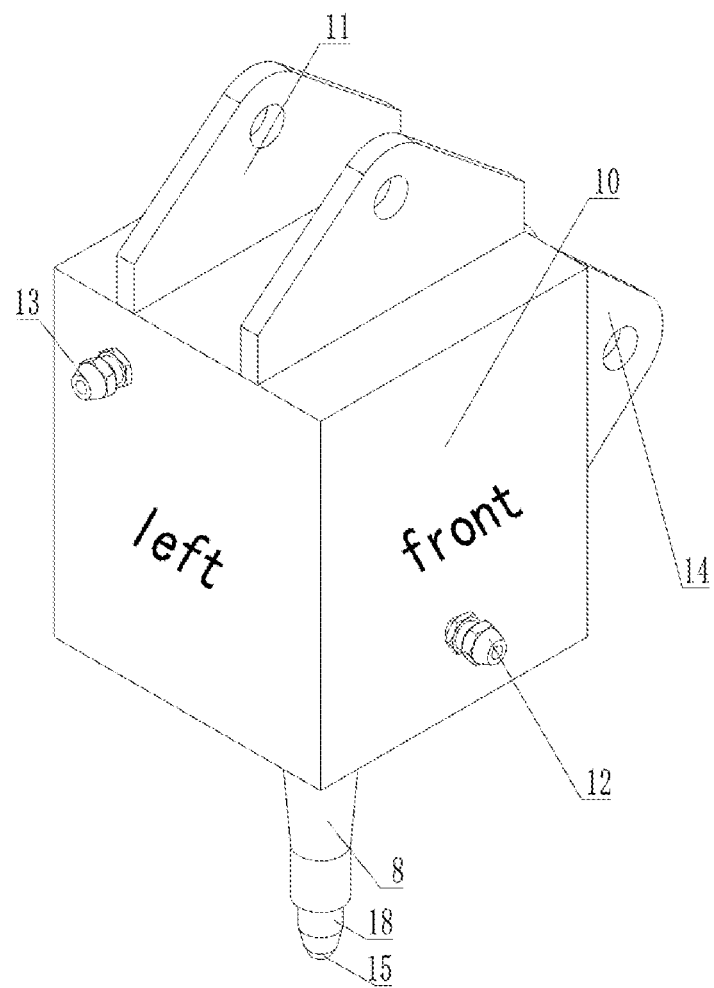
FIG. 5 is a schematic structural diagram of an amplitude transformer assembly according to the present invention.
Figure 6:
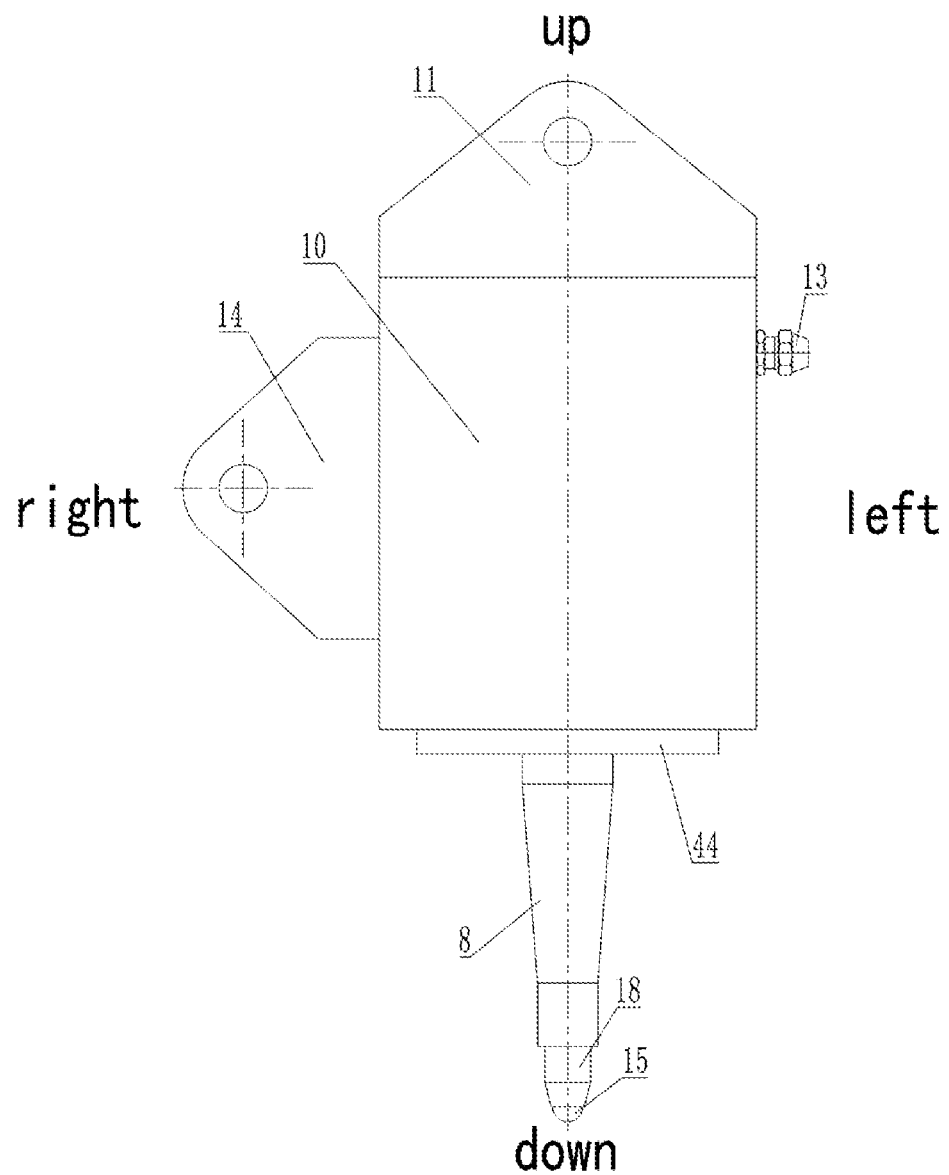
FIG. 6 is a rear view of the amplitude transformer assembly according to the present invention.
Figure 7:
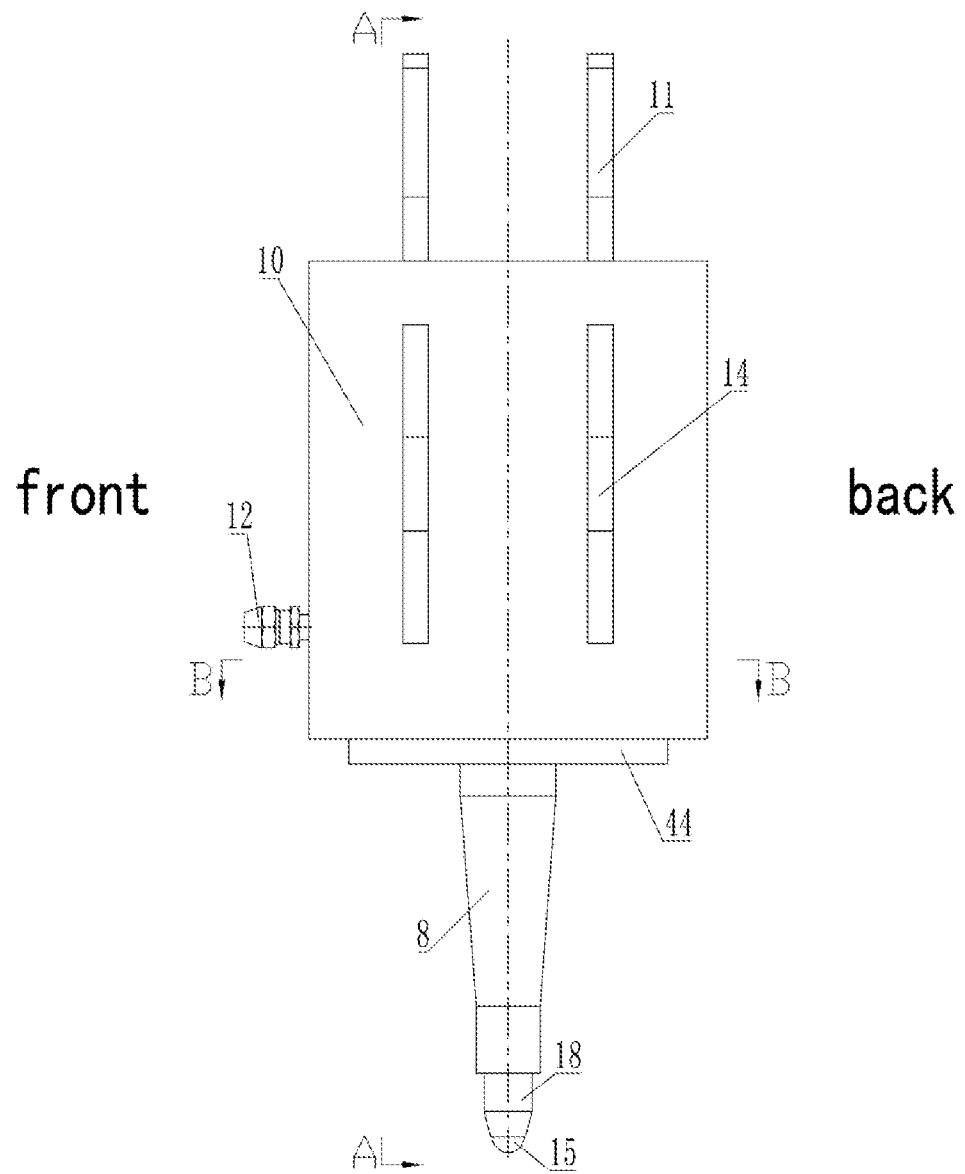
FIG. 7 is a right view of the amplitude transformer assembly according to the present invention.
Figure 8:
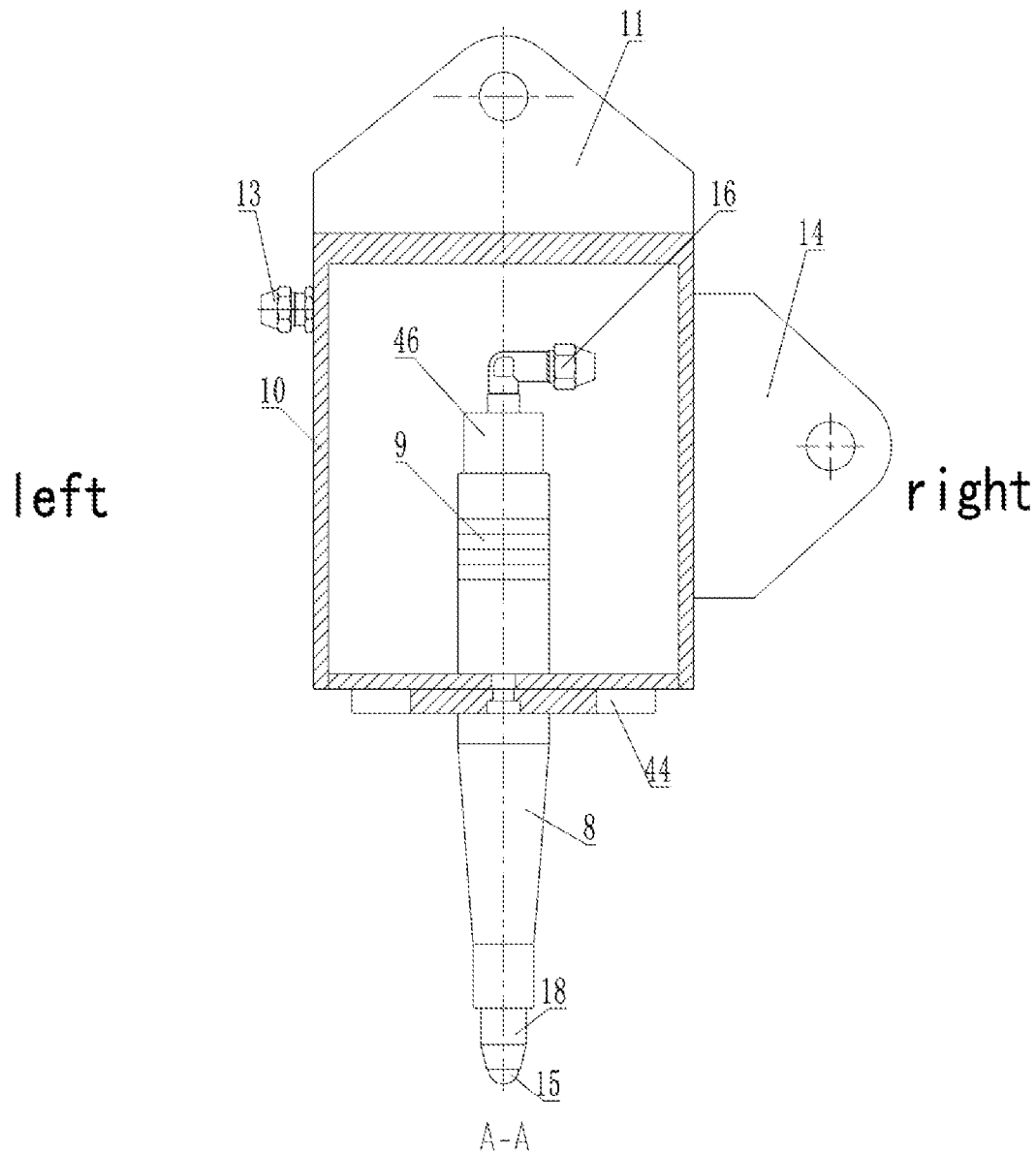
FIG. 8 is a sectional view taken along line A-A in FIG. 7.
Figure 9:
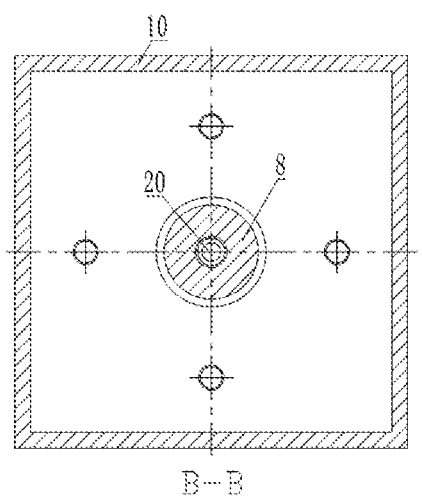
FIG. 9 is a sectional view taken along line B-B in FIG. 7.
Figure 10:
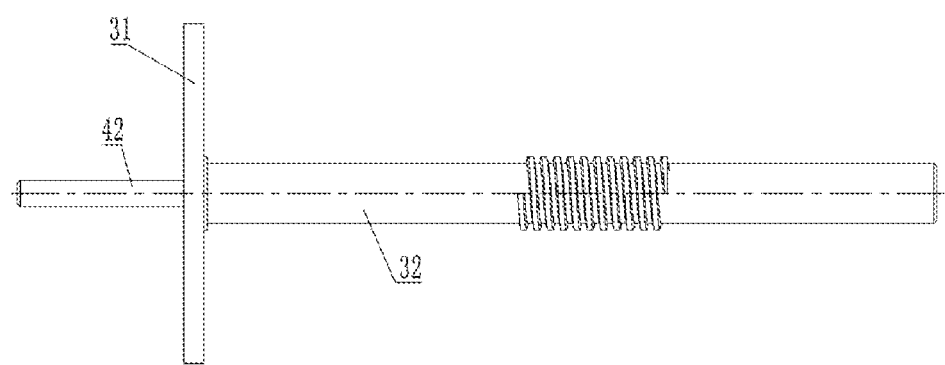
FIG. 10 is a schematic structural diagram of an indexing disc and a lead screw according to the present invention.
Figure 11:
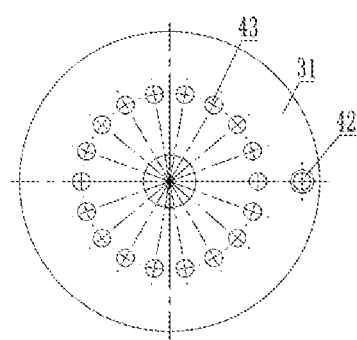
FIG. 11 is a left view of FIG. 10.
Figure 12:
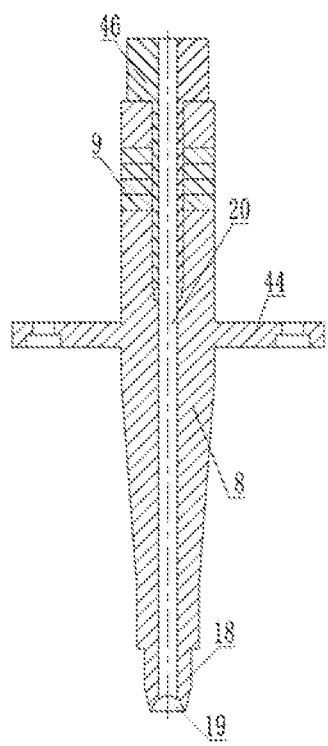
FIG. 12 is a sectional view of an amplitude transformer, a transducer and a rolling tool head according to the present invention.
Figure 13:
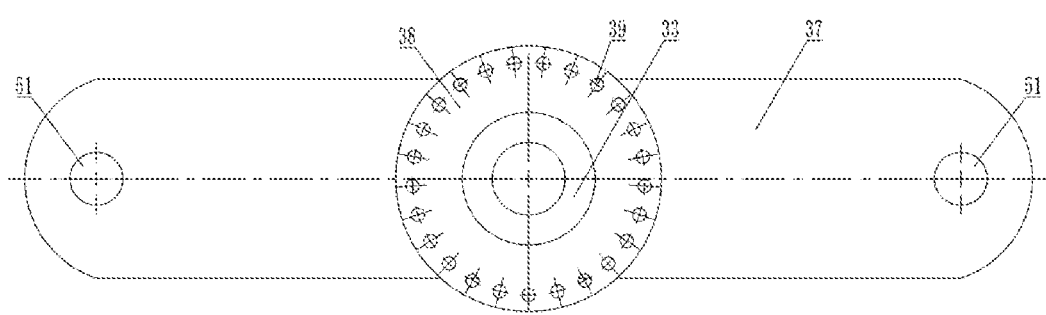
FIG. 13 is a rear view of a transmission sleeve according to the present invention.
Figure 14:
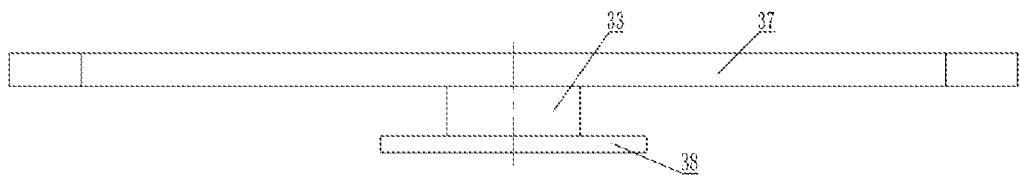
FIG. 14 is a top view of FIG. 13.
Figure 15:
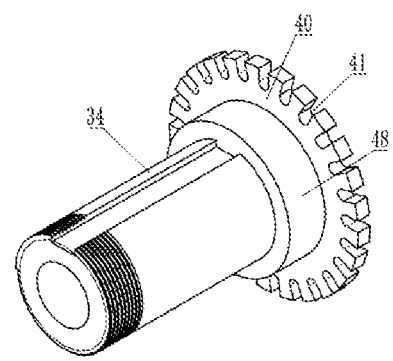
FIG. 15 is a schematic structural diagram of a circumferential workpiece positioning sleeve according to the present invention.
Figure 16:
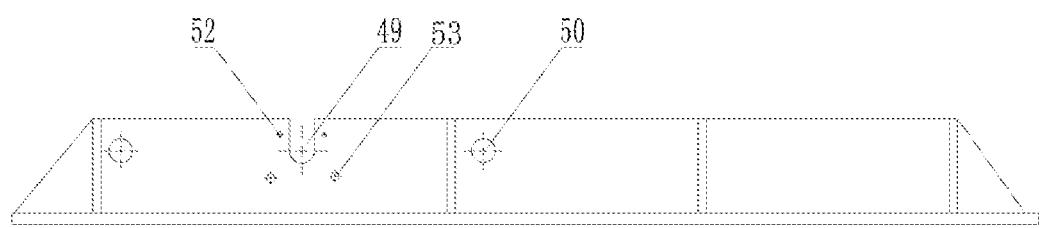
FIG. 16 is a front view of a front vertical support plate according to the present invention.

A portable multi-azimuth ultrasonic-assisted vibration rolling device as shown in FIGS. 1 to 15 includes an ultrasonic rolling unit, a hydraulic power unit, a pneumatic cooling unit, a main body frame and an indexing device; the ultrasonic rolling unit includes an ultrasonic generator 1 and an amplitude transformer assembly, and the ultrasonic generator 1 is connected with the amplitude transformer assembly which is provided in the main body frame; the hydraulic power unit includes a hydraulic station 2, a flow divider valve 3, a force-application hydraulic cylinder 4 and an angle-adjusting hydraulic cylinder 5; the flow divider valve 3 is mounted at the hydraulic station 2 and connected with the force-application hydraulic cylinder 4 and the angle-adjusting hydraulic cylinder 5 through an oil passage 6 respectively, the bottoms of cylinder bodies of the force-application hydraulic cylinder 4 and the angle-adjusting hydraulic cylinder 5 are articulated with the main body frame, and outer ends of piston rods of the force-application hydraulic cylinder 4 and the angle-adjusting hydraulic cylinder 5 are articulated with the amplitude transformer assembly respectively; the indexing device is provided at the main body frame below the amplitude transformer assembly, a gear workpiece 7 is mounted at the indexing device, and the amplitude transformer assembly comes into rolling contact with the surface of a tooth space of the gear workpiece 7.

The amplitude transformer assembly includes an amplitude transformer 8, a transducer 9, an amplitude-transformer protective box 10, a force-application lifting lug 11, a gas inlet connector 12, a gas return connector 13, a transposition lifting lug 14, a rolling steel ball 15, a negative-pressure gas extraction connector 16 and a negative pressure fan 17; the amplitude transformer 8 is vertically and fixedly mounted at the bottom of the amplitude-transformer protective box 10 by a flange 44, and has an upper end in the amplitude-transformer protective box 10 and a lower end below the bottom of the amplitude-transformer protective box 10; the transducer 9 is fixedly mounted at the upper end of the amplitude transformer 8 through a connecting bolt 46, a rolling tool head 18 is fixedly connected to the lower end of the amplitude transformer 8, and a ball socket 19 is provided at the lower end of the rolling tool head 18; the amplitude transformer 8, the transducer 9 and the rolling tool head 18 have coinciding center lines, the connecting bolt 46, the transducer 9, the amplitude transformer 8 and the rolling tool head 18 are all provided with through vent holes 20 along the center lines thereof, and the ball socket 19 is communicated with the vent holes 20; the rolling steel ball 15 is provided in the ball socket 19 at the lower end of the rolling tool head 18, and has a surface coming into rolling contact with the surface of the tooth space of the gear workpiece 7, and the negative-pressure gas extraction connector 16 is fixedly mounted at the top of the connecting bolt 46 and communicated with the vent holes 20; the negative pressure fan 17 is connected with a suction pipe 21, the suction pipe 21 penetrates through the amplitude-transformer protective box 10 to be connected with the negative-pressure gas extraction connector 16, the contact part of the suction pipe 21 and the amplitude-transformer protective box 10 is sealed, and the ultrasonic generator 1 is connected with the transducer 9 through a cable 22; the force-application lifting lug 11 is fixedly connected to the top of the amplitude-transformer protective box 10, the gas return connector 13 is fixedly mounted at the left side of the amplitude-transformer protective box 10, the gas inlet connector 12 is fixedly mounted on the front side of the amplitude-transformer protective box 10, and the transposition lifting lug 14 is fixedly connected to the right side of the amplitude-transformer protective box 10.

The pneumatic cooling unit includes a cooling-gas circulating device 23 and a gas distributing valve 24, the gas distributing valve 24 is mounted at the cooling-gas circulating device 23, a gas inlet pipe 25 is connected between a gas outlet of the gas distributing valve 24 and the gas inlet connector 12, and a gas outlet pipe 26 is connected between a gas inlet of the gas distributing valve 24 and the gas return connector 13.

The main body frame is configured as a quadrangular frame and enclosed by four vertical square tubes 27 and eight horizontal square tubes 28, and a supporting square tube 29 is fixedly connected between the two vertical square tubes 27 on the right side; the amplitude-transformer protective box 10 is located in the main body frame, the bottom of the cylinder body of the force-application hydraulic cylinder 4 is articulated with the upper-right horizontal square tube 28, and an outer end of the piston rod of the force-application hydraulic cylinder 4 is articulated with the force-application lifting lug 11; the bottom of the cylinder body of the angle-adjusting hydraulic cylinder 5 is articulated with the supporting square tube 29, and an outer end of the piston rod of the angle-adjusting hydraulic cylinder 5 is articulated with the transposition lifting lug 14; a platform support is fixedly connected between the two horizontal square tubes 28 at the lower left and the lower right of the main body frame, and the indexing device is mounted at the platform support.

The platform support includes two vertical support plates 30 which are horizontally arranged in a left-right direction in parallel, two ends of each vertical support plate 30 are fixedly connected to the lower-left and lower-right horizontal square tubes 28, two bolt holes 50 and a vertical long hole 49 are formed at symmetrical positions in a front-rear direction of each vertical support plate 30, an upper side of the vertical long hole 49 is open, at least one bolt hole 52 is formed in each of the two sides of the vertical long hole 49 of each vertical support plate 30, and at least one inserting hole 53 is formed in each of the two sides of the vertical long hole 49 of the front vertical support plate 30.

The indexing device includes an indexing disc 31, a lead screw 32, a transmission sleeve 33, a circumferential workpiece positioning sleeve 34, two guide slide bars 35 and two copper bushes 36; the lead screw 32 and the guide slide bars 35 are all horizontally arranged in the front-rear direction; the transmission sleeve 33 and the circumferential workpiece positioning sleeve 34 are mounted at the lead screw 32, the transmission sleeve 33 is located in front of the circumferential workpiece positioning sleeve 34, and connected with the lead screw 32 in a threaded transmission manner, the circumferential workpiece positioning sleeve 34 is slidably connected with the lead screw 32, and the total length of the transmission sleeve 33 plus the circumferential workpiece positioning sleeve 34 is less than a distance between the two vertical support plates 30; the two copper bushes 36 have coinciding axes, and are fixedly connected to the vertical support plates 30 by inserting bolts into the bolt holes 52 on the two sides of the vertical long holes 49; two ends of the lead screw 32 are mounted at the copper bushes 36, the lead screw 32 penetrates through the vertical long holes 49 in the vertical support plates 30, and the front end surfaces of the lead screw 32 are located in front of the vertical support plates 30; a guide plate 37 is provided at the front end of the transmission sleeve 33, two bolt holes 51 are formed in the guide plate 37, the two guide slide bars 35 penetrate through the two bolt holes 51 respectively, a main positioning disc 38 is provided at the rear end of the transmission sleeve 33, at least one threaded through hole 39 is formed in the main positioning disc 38, and the guide plate 37, the transmission sleeve 33 and the main positioning disc 38 are integrated; the two guide slide bars 35 are symmetrically arranged with the lead screw 32 as the center line, inserted through the vertical support plates 30 and the guide plate 37 and fastened to the vertical support plates 30 by nuts; an auxiliary positioning disc 40 is provided at the front end of the circumferential workpiece positioning sleeve 34 and integrated with the circumferential workpiece positioning sleeve 34, and at least one half-track-shaped long hole 41 is formed in the auxiliary positioning disc 40; the auxiliary positioning disc 40 is in pressing contact with the main positioning disc 38, and a positioning bolt 45 penetrates through the threaded through hole 39 in the main positioning disc 38 and the half-track-shaped long hole 41 in the auxiliary positioning disc 40, such that the main positioning disc 38 is fixedly connected with the auxiliary positioning disc 40; a shaft shoulder 48 is provided between the circumferential workpiece positioning sleeve 34 and the auxiliary positioning disc 40 for connection, the circumferential workpiece positioning sleeve 34 is sleeved with the gear workpiece 7 which is fixed by a key, a locking nut 47 is mounted at a rear thread of the circumferential workpiece positioning sleeve 34, and is in pressing contact with the rear side surface of the gear workpiece 7, and the front side surface of the gear workpiece 7 is in pressing contact with the shaft shoulder 48; the indexing disc 31 is fixedly mounted at the front end of the lead screw 32 by welding, the indexing disc 31, the lead screw 32, the transmission sleeve 33 and the circumferential workpiece positioning sleeve 34 have coinciding center lines, the front side surface of the indexing disc 31 is fixedly connected with at least one rocking handle 42, at least one positioning through hole 43 is uniformly formed in the indexing disc 31 along the circumference thereof and may correspond to the inserting hole 53 in the front vertical support plate 30, and a positioning pin is inserted through the inserting hole 53 in the vertical support plate 30 and the positioning through hole 43 in the indexing disc 31, so as to fix the indexing disc 31.

The fastening nut, the key and the positioning pin are of conventional design and are not shown in the drawings.

The method of using the portable multi-azimuth ultrasonic-assisted vibration rolling device of the present invention includes the following steps:

(1) mounting the gear workpiece 7;

(2) starting the negative pressure fan 17, the negative pressure fan 17 vacuumizing the vent holes 20 of the amplitude transformer 8, the transducer 9 and the rolling tool head 18 through the suction pipe 21, such that the rolling steel ball 15 is sucked in the ball socket 19, and at this point, the surface of the rolling steel ball 15 is in rolling contact with the surface of one tooth space of the gear workpiece 7;

(3) starting the ultrasonic generator 1, the cooling-gas circulating device 23 and the gas distributing valve 24, wherein the ultrasonic generator 1 provides a high-frequency pulse signal for the transducer 9 through the cable 22, the transducer 9 converts the high-frequency pulse signal into mechanical vibration, such that the amplitude transformer 8 generates high-frequency vibration and drives the rolling tool head 18 to vibrate at a high frequency, and as such, the rolling steel ball 15 vibrates at a high frequency with the rolling tool head 18 to impact the surface of the gear workpiece 7 at a high frequency; the cooling-gas circulating device 23 outputs cooling gas through the gas outlet of the gas distributing valve 24, the cooling gas enters the amplitude-transformer protective box 10 through the gas inlet pipe 25 and the gas inlet connector 12 to cool the transducer 9, and the cooling gas after heat exchange is discharged out of the amplitude-transformer protective box 10 through the gas return connector 13 and the gas outlet pipe 26, and then enters the cooling-gas circulating device 23 through the gas inlet of the gas distributing valve 24 to be compressed and cooled;

(4) starting the hydraulic station 2, the hydraulic station 2 controlling the force-application hydraulic cylinder 4 and the angle-adjusting hydraulic cylinder 5 with the flow divider valve 3 respectively, and the piston rods of the force-application hydraulic cylinder 4 and the angle-adjusting hydraulic cylinder 5 being stretched and retracted to adjust the angle and the position of the amplitude-transformer protective box 10, so as to control the pressure applied to the surface of the gear workpiece 7 by the rolling steel ball 15 and the force application angle; after the surface of the gear workpiece 7 coming into rolling contact with the rolling steel ball 15 is impacted to be strengthened by the rolling steel ball 15, the positioning pin is drawn out, the indexing disc 31 is rotated by 20 degrees with the rocking handle 42, the lead screw 32 rotates and drives the transmission sleeve 33 to move by a certain feeding amount along the two guide slide bars 35, and then, the positioning pin is inserted to fix the indexing disc 31, such that the gear workpiece 7 moves by a certain amount along the axial direction of the lead screw 32; as such, the surface of the tooth space of the gear workpiece 7 coming into contact with the rolling steel ball 15 is impacted to be strengthened by the rolling steel ball 15, and the above operations are repeated until all the surfaces of the tooth space of the gear workpiece 7 at this position are impacted to be strengthened by the rolling steel ball 15;

(5) rotating the gear workpiece 7 to enable the rolling steel ball 15 to come into rolling contact with the surfaces of the next tooth space of the gear workpiece 7, and repeating the steps (3) and (4) to enable the surfaces of the next tooth space of the gear workpiece 7 to be impacted to be strengthened by the rolling steel ball 15; and (6) taking out the gear workpiece 7 after the surfaces of all the tooth spaces of the gear workpiece 7 are rolled.

The step (1) specifically includes: firstly, mounting the transmission sleeve 33 and the circumferential workpiece positioning sleeve 34 at the lead screw 32, wherein the transmission sleeve 33 is located in front of the circumferential workpiece positioning sleeve 34; inserting the positioning bolt 45 through the threaded through hole 39 in the main positioning disc 38 and the half-track-shaped long hole 41 in the auxiliary positioning disc 40, so as to fixedly connect the main positioning disc 38 with the auxiliary positioning disc 40, thereby fixedly connecting the circumferential workpiece positioning sleeve 34 with the transmission sleeve 33; then, sleeving the circumferential workpiece positioning sleeve 34 with the gear workpiece 7, mounting the two ends of the lead screw at the copper bushes 36, inserting the lead screw 32 through the vertical long holes 49 in the vertical support plates 30, fixedly mounting the copper bushes 36 at the vertical support plates 30 through the bolts, inserting the two guide slide bars 35 through the vertical support plates 30 and the guide plate 37, and fixing the two ends of the guide slide bars 35 with the fastening nuts; finally, inserting the positioning pin through the inserting holes 53 in the vertical support plates 30 and the positioning through hole 43 in the indexing disc 31, so as to fix the indexing disc 31, thereby guaranteeing fixation of the gear workpiece 7.

The step (5) specifically includes: removing the positioning bolt 45, rotating the circumferential workpiece positioning sleeve 34, rotating and displacing the tooth space of the gear workpiece 7 which is impacted to be strengthened, and meanwhile enabling the surfaces of the next tooth space of the gear workpiece 7 which is not impacted to be strengthened to come into rolling contact with the rolling steel ball; then, inserting the positioning bolt 45 through the threaded through hole 39 in the main positioning disc 38 and the half-track-shaped long hole 41 in the auxiliary positioning disc 40, so as to fixedly connect the main positioning disc 38 with the auxiliary positioning disc 40, thereby fixedly connecting the circumferential workpiece positioning sleeve 34 with the transmission sleeve 33; repeating the steps (3) and (4) to enable the surfaces of the next tooth space of the gear workpiece 7 to be impacted to be strengthened by the rolling steel ball 15.

The step (6) specifically includes: firstly, removing the fastening nuts, drawing out all the guide slide bars 35, removing the bolts for fixing the copper bushes 36, taking the lead screw 32 out of the vertical long holes 49 in the vertical support plates 30, pulling away the copper bush 36 on the side of the circumferential workpiece positioning sleeve 34 from the lead screw 32, removing the locking nut 47 from the circumferential workpiece positioning sleeve 34, and taking away the gear workpiece 7 from the circumferential workpiece positioning sleeve 34.

The present invention has the following beneficial effects.

1. In the present invention, the hydraulic power unit is provided to control the pressure applied to the surface of the gear workpiece 7 by the rolling steel ball 15 and the force application angle by means of the cooperation of the hydraulic station 2, the force-application hydraulic cylinder 4 and the angle-adjusting hydraulic cylinder 5, such that the traditional machining process is not limited by a machine tool, and the integral rolling device is more flexible and portable in use.

2. In the present invention, the pneumatic cooling unit is provided to convey the cooling gas into the amplitude-transformer protective box 10 by the cooling-gas circulating device 23, the cooling gas cooling the transducer 9 in the amplitude-transformer protective box 10, and then being discharged from the amplitude-transformer protective box 10 into the cooling-gas circulating device 23, and as such, the cooling gas is continuously conveyed to cool the transducer 9 continuously when the ultrasonic rolling device is working, and the transducer 9 is guaranteed to work continuously and efficiently.

3. The amplitude transformer 8, the transducer 9 and the rolling tool head 18 according to the present invention are all provided with the vent holes 20 which are vertically through along the center lines thereof, the ball socket 19 is communicated with the vent holes 20, the rolling steel ball 15 is provided in the ball socket 19 at the lower end of the rolling tool head 18, the negative-pressure gas extraction connector 16 is fixedly mounted at the top of the transducer 9 through the connecting bolt and communicated with the vent holes 20, the negative pressure fan 17 is connected with the suction pipe 21, the suction pipe 21 penetrates through the amplitude-transformer protective box 10 and is connected with the negative-pressure gas extraction connector 16, and the negative pressure fan 17 vacuumizes the vent holes 20 of the amplitude transformer 8, the transducer 9 and the rolling tool head 18 through the suction pipe 21, such that the rolling steel ball 15 is sucked in the ball socket 19; with this technical solution, the rolling steel ball 15 is fixed more conveniently, which not only avoids the abrasion of the surface of the steel ball 15 caused when the steel ball is fastened by extrusion, but also saves the complicated operation procedure when the steel ball is fastened by a pressing cap.

4. In the present invention, transmission of the lead screw 32 is combined with the indexing disc 31 to conveniently control the distance of each axial feeding action of the gear workpiece 7 along the lead screw 32, and to ensure that all the surfaces of each tooth space of the gear workpiece 7 are rolled and impacted to be strengthened by the rolling steel ball 15; the circumferential workpiece positioning sleeve 34 is provided, such that the gear workpiece 7 may be rotated conveniently to rotate and the tooth space of the gear workpiece 7 which is impacted to be strengthened is displaced, and meanwhile, the surface of the next tooth space of the gear workpiece 7 which is not impacted to be strengthened comes into rolling contact with the rolling steel ball 15, such that the surface of the next tooth space of the gear workpiece 7 is impacted to be strengthened by the rolling steel ball 15.

The present invention may be used for machining materials difficult to machine, such as hard alloy, titanium alloy, high-strength steel, or the like, expands the application range of the ultrasonic rolling process, is easy to popularize and implement and has good economic benefits.

The above are merely the preferred embodiments of the present invention and shall not be used to limit the present invention. Any modifications, equivalents and improvements made within the spirit and principle of the present invention shall fall within the protection scope of the present invention.

What is claimed is:

1. A portable multi-azimuth ultrasonic-assisted vibration rolling device, comprising:

an ultrasonic rolling unit, a hydraulic power unit, a pneumatic cooling unit, a main body frame and an indexing device; the ultrasonic rolling unit includes an ultrasonic generator and an amplitude transformer assembly, and the ultrasonic generator is connected with the amplitude transformer assembly which is provided in the main body frame; the hydraulic power unit includes a hydraulic station, a flow divider valve, a force-application hydraulic cylinder and an angle-adjusting hydraulic cylinder; the flow divider valve is mounted at the hydraulic station and connected with the force-application hydraulic cylinder and the angle-adjusting hydraulic cylinder through an oil passage respectively, the bottoms of cylinder bodies of the force-application hydraulic cylinder and the angle-adjusting hydraulic cylinder are articulated with the main body frame, and outer ends of piston rods of the force-application hydraulic cylinder and the angle-adjusting hydraulic cylinder are articulated with the amplitude transformer assembly respectively; the indexing device is provided at the main body frame below the amplitude transformer assembly, a gear workpiece is mounted at the indexing device, and the amplitude transformer assembly comes into rolling contact with the surface of a tooth space of the gear workpiece; and The amplitude transformer assembly includes an amplitude transformer, a transducer, an amplitude-transformer protective box, a force-application lifting lug, a gas inlet connector, a gas return connector, a transposition lifting lug, a rolling steel ball, a negative-pressure gas extraction connector and a negative pressure fan; the amplitude transformer is vertically and fixedly mounted at the bottom of the amplitude-transformer protective box by a flange, and has an upper end in the amplitude-transformer protective box and a lower end below the bottom of the amplitude-transformer protective box; the transducer is fixedly mounted at the upper end of the amplitude transformer through a connecting bolt, a rolling tool head is fixedly connected to the lower end of the amplitude transformer, and a ball socket is provided at the lower end of the rolling tool head the amplitude transformer, the transducer and the rolling tool head have coinciding center lines, the connecting bolt, the transducer, the amplitude transformer and the rolling tool head are all provided with through vent holes along the center lines thereof, and the ball socket is communicated with the vent holes; the rolling steel ball is provided in the ball socket at the lower end of the rolling tool head, and has a surface coming into rolling contact with the surface of the tooth space of the gear workpiece, and the negative-pressure gas extraction connector is fixedly mounted at the top of the connecting bolt and communicated with the vent holes; the negative pressure fan is connected with a suction pipe, the suction pipe penetrates through the amplitude-transformer protective box to be connected with the negative-pressure gas extraction connector, the contact part of the suction pipe and the amplitude-transformer protective box is sealed, and the ultrasonic generator is connected with the transducer through a cable; the force-application listing lug is fixedly connected to the top of the amplitude-transformer protective box, the gas return connector is fixedly mounted at the left side of the amplitude-transformer protective box, the gas inlet connector is fixedly mounted on the front side of the amplitude-transformer protective box, and the transposition lifting lug is fixedly connected to the right side of the amplitude-transformer protective box;

The pneumatic cooling unit includes a cooling-gas circulating device and a gas distributing valve, the gas distributing valve is mounted at the cooling-gas circulating device, a gas inlet pipe is connected between a gas outlet of the gas distributing valve and the gas inlet connector, and a gas outlet pipe is connected between a gas inlet of the gas distributing valve and the gas return connector.

2. The portable multi-azimuth ultrasonic-assisted vibration rolling device according to claim 1, wherein the main body frame is configured as a quadrangular frame and enclosed by four vertical square tubes and eight horizontal square tubes, and a supporting square tube is fixedly connected between the two vertical square tubes on the right side; the amplitude-transformer protective box is located in the main body frame, the bottom of the cylinder body of the force-application hydraulic cylinder is articulated with the upper-right horizontal square tube, and an outer end of the piston rod of the force-application hydraulic cylinder is articulated with the force-application lifting lug; the bottom of the cylinder body of the angle-adjusting hydraulic cylinder is articulated with the supporting square tube, and an outer end of the piston rod of the angle-adjusting hydraulic cylinder is articulated with the transposition lifting lug; a platform support is fixedly connected between the two horizontal square tubes at the lower left and the lower right of the main body frame, and the indexing device is mounted at the platform support.

3. The portable multi-azimuth ultrasonic-assisted vibration rolling device according to claim 2, wherein the platform support includes two vertical support plates which are horizontally arranged in a left-right direction in parallel, two ends of each vertical support plate are fixedly connected to the lower-left and lower-right horizontal square tubes, two bolt holes and a vertical long hole are formed at symmetrical positions in a front-rear direction of each vertical support plate, an upper side of the vertical long hole is open, at least one bolt hole is formed in each of the two sides of the vertical long hole of each vertical support plate, and at least one inserting hole is formed in each of the two sides of the vertical long hole of the front vertical support plate;

the indexing device includes an indexing disc, a lead screw, a transmission sleeve, a circumferential workpiece positioning sleeve, two guide slide bars and two copper bushes; the lead screw and the guide slide bars are all horizontally arranged in the front-rear direction; the transmission sleeve and the circumferential workpiece positioning sleeve are mounted at the lead screw, the transmission sleeve is located in front of the circumferential workpiece positioning sleeve, and connected with the lead screw in a threaded transmission manner, the circumferential workpiece positioning sleeve is slidably connected with the lead screw, and the total length of the transmission sleeve plus the circumferential workpiece positioning sleeve is less than a distance between the two vertical support plates; the two copper bushes have coinciding axes, and are fixedly connected to the vertical support plates by inserting bolts into the bolt holes on the two sides of the vertical long holes; two ends of the lead screw are mounted at the copper bushes, the lead screw penetrates through the vertical long holes in the vertical support plates, and the front end surfaces of the lead screw are located in front of the vertical support plates; a guide plate is provided at the front end of the transmission sleeve, two bolt holes are formed in the guide plate, the two guide slide bars penetrate through the two bolt holes respectively, a main positioning disc is provided at the rear end of the transmission sleeve, at least one threaded through hole is formed in the main positioning disc, and the guide plate, the transmission sleeve and the main positioning disc are integrated; the two guide slide bars are symmetrically arranged with the lead screw as the center line, inserted through the vertical support plates and the guide plate and fastened to the vertical support plates by nuts; an auxiliary positioning disc is provided at the front end of the circumferential workpiece positioning sleeve and integrated with the circumferential workpiece positioning sleeve, and at least one half-track-shaped long hole is formed in the auxiliary positioning disc; the auxiliary positioning disc is in pressing contact with the main positioning disc, and a positioning bolt penetrates through the threaded through hole in the main positioning disc and the half-track-shaped long hole in the auxiliary positioning disc, such that the main positioning disc is fixedly connected with the auxiliary positioning disc; a shaft shoulder is provided between the circumferential workpiece positioning sleeve and the auxiliary positioning disc for connection, the circumferential workpiece positioning sleeve is sleeved with the gear workpiece which is fixed by a key, a locking nut is mounted at a rear thread of the circumferential workpiece positioning sleeve, and is in pressing contact with the rear side surface of the gear workpiece, and the front side surface of the gear workpiece is in pressing contact with the shaft shoulder; the indexing disc is fixedly mounted at the front end of the lead screw by welding, the indexing disc, the lead screw, the transmission sleeve and the circumferential workpiece positioning sleeve have coinciding center lines, the front side surface of the indexing disc is fixedly connected with at least one rocking handle, at least one positioning through hole is uniformly formed in the indexing disc along the circumference thereof and may correspond to the inserting hole in the front vertical support plate, and a positioning pin is inserted through the inserting hole in the vertical support plate and the positioning through hole in the indexing disc, so as to fix the indexing disc.

4. An application method of the portable multi-azimuth ultrasonic-assisted vibration rolling device according to claim 3, comprising the following steps:

(1) mounting the gear workpiece;

(2) starting the negative pressure fan, the negative pressure fan vacuumizing the vent holes of the amplitude transformer, the transducer and the rolling tool head through the suction pipe, such that the rolling steel ball is sucked in the ball socket, and at this point, the surface of the rolling steel ball is in rolling contact with the surface of one tooth space of the gear workpiece;

(3) starting the ultrasonic generator, the cooling-gas circulating device and the gas distributing valve, wherein the ultrasonic generator provides a high-frequency pulse signal for the transducer through the cable, transducer converts the high-frequency pulse signal into mechanical vibration, such that the amplitude transformer generates high-frequency vibration and drives the rolling tool head to vibrate at a high frequency, and as such, the rolling steel ball vibrates at a high frequency with the rolling tool head to impact the surface of the gear workpiece at a high frequency; the cooling-gas circulating device outputs cooling gas through the gas outlet of the gas distributing valve, the cooling gas enters the amplitude-transformer protective box through the gas inlet pipe and the gas inlet connector to cool the transducer, and the cooling gas after heat exchange is discharged out of the amplitude-transformer protective box through the gas return connector and the gas outlet pipe, and then enters the cooling-gas circulating device through the gas inlet of the gas distributing valve to be compressed and cooled;

(4) starting the hydraulic station, the hydraulic station controlling the force-application hydraulic cylinder and the angle-adjusting hydraulic cylinder with the flow divider valve respectively, and the piston rods of the force-application hydraulic cylinder and the angle-adjusting hydraulic cylinder being stretched and retracted to adjust the angle and the position of the amplitude-transformer protective box, so as to control the pressure applied to the surface of the gear workpiece by the rolling steel ball and the force application angle; after the surface of the gear workpiece coming into rolling contact with the rolling steel ball is impacted to be strengthened by the rolling steel ball, the positioning pin is drawn out, the indexing disc is rotated by 20 degrees with the rocking handle, the lead screw rotates and drives the transmission sleeve to move by a certain feeding amount along the two guide slide bars, and then, the positioning pin is inserted to fix the indexing disc, such that the gear workpiece moves by a certain amount along the axial direction of the lead screw; as such, the surface of the tooth space of the gear workpiece coming into contact with the rolling steel ball is impacted to be strengthened by the rolling steel ball, and the above operations are repeated until all the surfaces of the tooth space of the gear workpiece at this position are impacted to be strengthened by the rolling steel ball;

(5) rotating the gear workpiece to enable the rolling steel ball to come into rolling contact with the surfaces of the next tooth space of the gear workpiece, and repeating the steps (3) and (4) to enable the surfaces of the next tooth space of the gear workpiece to be impacted to be strengthened by the rolling steel ball; and (6) taking out the gear workpiece after the surfaces of all the tooth spaces of the gear workpiece are rolled.

5. The application method of the portable multi-azimuth ultrasonic-assisted vibration rolling device according to claim 4, wherein the step (1) specifically includes: firstly, mounting the transmission sleeve and the circumferential workpiece positioning sleeve at the lead screw, wherein the transmission sleeve is located in front of the circumferential workpiece positioning sleeve; inserting the positioning bolt through the threaded through hole in the main positioning disc and the half-track-shaped long hole in the auxiliary positioning disc, so as to fixedly connect the main positioning disc with the auxiliary positioning disc, thereby fixedly connecting the circumferential workpiece positioning sleeve with the transmission sleeve; then, sleeving the circumferential workpiece positioning sleeve with the gear workpiece, mounting the two ends of the lead screw at the copper bushes, inserting the lead screw through the vertical long holes in the vertical support plates, fixedly mounting the copper bushes at the vertical support plates through the bolts, inserting the two guide slide bars through the vertical support plates and the guide plate, and fixing the two ends of the guide slide bars with the fastening nuts; finally, inserting the positioning pin through the inserting holes in the vertical support plates and the positioning through hole in the indexing disc, so as to fix the indexing disc, thereby guaranteeing fixation of the gear workpiece.

6. The application method of the portable multi-azimuth ultrasonic-assisted vibration rolling device according to claim 4, wherein the step (5) specifically includes: removing the positioning bolt, rotating the circumferential workpiece positioning sleeve, rotating and displacing the tooth space of the gear workpiece which is impacted to be strengthened, and meanwhile enabling the surfaces of the next tooth space of the gear workpiece which is not impacted to be strengthened to come into rolling contact with the rolling steel ball; then, inserting the positioning bolt through the threaded through hole in the main positioning disc and the half-track-shaped long hole in the auxiliary positioning disc, so as to fixedly connect the main positioning disc with the auxiliary positioning disc, thereby fixedly connecting the circumferential workpiece positioning sleeve with the transmission sleeve; repeating the steps (3) and (4) to enable the surfaces of the next tooth space of the gear workpiece to be impacted to be strengthened by the rolling steel ball.

7. The application method of the portable multi-azimuth ultrasonic-assisted vibration rolling device according to claim 4, wherein the step (6) specifically includes: firstly, removing the fastening nuts, drawing out all the guide slide bars, removing the bolts for fixing the copper bushes, taking the lead screw out of the vertical long holes in the vertical support plates, pulling away the copper bush on the side of the circumferential workpiece positioning sleeve from the lead screw, removing the locking nut from the circumferential workpiece positioning sleeve, and taking away the gear workpiece from the circumferential workpiece positioning sleeve.

\* \* \* \* \*